(12) United States Patent
Dismukes et al.

(10) Patent No.: US 6,624,228 B1
(45) Date of Patent: *Sep. 23, 2003

(54) SYNTHESIS OF MICROPOROUS CERAMICS

(75) Inventors: John Pickett Dismukes, Annandale, NJ (US); Jack Wayne Johnson, Clinton, NJ (US); Edward William Corcoran, Jr., Easton, PA (US); Joseph Vallone, Roselle, NJ (US)

(73) Assignee: ExxonMobil Research and Engineering Company, Annandale, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1130 days.

(21) Appl. No.: 08/668,640

(22) Filed: Jun. 21, 1996

Related U.S. Application Data

(62) Division of application No. 08/248,291, filed on May 24, 1994, now Pat. No. 5,563,212.

(51) Int. Cl.$^7$ .................................................. C08K 3/34
(52) U.S. Cl. ...................... 524/444; 524/449; 524/450; 524/451
(58) Field of Search ................ 524/786, 588, 524/492, 495, 496, 428, 424, 413, 420, 431, 430, 437, 450, 436, 432; 501/80, 88; 428/429, 447, 312.8, 315.5; 427/447, 461, 469, 489

(56) References Cited

U.S. PATENT DOCUMENTS

| | | | |
|---|---|---|---|
| 3,926,702 A | * 12/1975 | Oki et al. ..................... 428/218 |
| 4,314,956 A | * 2/1982 | Baney et al. ................. 524/588 |
| 4,722,988 A | * 2/1988 | Porte et al. .................... 528/15 |
| 4,826,892 A | 5/1989 | Shimada et al. ............. 522/148 |
| 4,833,107 A | 5/1989 | Kaya et al. .................... 501/97 |
| 4,835,207 A | * 5/1989 | Semen et al. ................ 524/588 |
| 4,891,340 A | 1/1990 | Semen et al. .................. 501/88 |
| 4,923,747 A | * 5/1990 | McCullough et al. ..... 428/312.6 |
| 4,929,507 A | 5/1990 | Nishihara et al. ............ 524/428 |
| 4,937,304 A | * 6/1990 | Ayama et al. .................. 528/28 |
| 4,942,145 A | 7/1990 | Moehle et al. ................ 501/90 |
| 4,950,381 A | * 8/1990 | Takeuchi et al. .............. 528/10 |
| 5,006,492 A | 4/1991 | Semen et al. .................. 501/97 |
| 5,116,663 A | * 5/1992 | Fujimoto et al. ......... 428/312.8 |
| 5,120,692 A | * 6/1992 | Beck ............................ 502/60 |
| 5,132,354 A | * 7/1992 | DeLaet ....................... 524/428 |
| 5,191,137 A | * 3/1993 | Beck .......................... 208/114 |
| 5,194,338 A | * 3/1993 | Niebylski .................... 524/588 |
| 5,258,224 A | * 11/1993 | Langlois et al. ............. 524/428 |
| 5,393,815 A | * 2/1995 | Takeda et al. ............... 524/588 |
| 5,543,369 A | * 8/1996 | Jensen ......................... 522/148 |
| 5,563,212 A | * 10/1996 | Dismukes et al. .......... 524/786 |
| 5,677,372 A | * 10/1997 | Yamamoto et al. ......... 524/495 |
| 5,691,433 A | * 11/1997 | Kotani et al. .................. 528/15 |
| 5,837,364 A | * 11/1998 | Zank ............................ 528/15 |

FOREIGN PATENT DOCUMENTS

| | | |
|---|---|---|
| EP | 0200326 A1 | 12/1986 |
| EP | 0331424 A1 | 9/1989 |
| EP | 0376183 A1 | 7/1990 |
| EP | 0389084 A2 | 9/1990 |

OTHER PUBLICATIONS

Ceramics from Organometallic Polymers, Peuckert et al, 1990, pp. 398–404.
Pyrolysis Chemistry of Poly(organosilazanes) to Silicon Ceramics, Han et al, Feb. 24, 1992, pp. 705–711.
A method for the determination of the pore size distribution of molecular sieve materials and its application to the characterizetion of partially pyrolyzed polysilastyrene/porous glass composite membranes, Grosgogeat et al, Nov. 5, 1990, pp. 237–255.
J. F. Janik et al, "Boron Nitride as a Selective Gas Adsorbent", Langmuir 1994, vol. 10, pp. 514–518.
T. T. Borek et al, "Highly Microporous Boron Nitride For Gas Adsorption", Langmuir 1991, vol. 7, pp. 2844–2846.

* cited by examiner

*Primary Examiner*—Peter Szekely
(74) *Attorney, Agent, or Firm*—Joseph C. Wang

(57) ABSTRACT

The present invention provides for microporous ceramic materials having a surface area in excess of 50 m$^2$/gm and an open microporous cell structure wherein the micropores have a mean width of less than 20 Angstroms and wherein said microporous structure comprises a volume of greater than about 0.015 cm$^3$/gm of the ceramic. The invention also provides for a preceramic composite intermediate composition comprising a mixture of a ceramic precursor and finely divided particles comprising a non-silicon containing ceramic, carbon, or an inorganic compound having a decomposition temperature in excess of 400° C., whose pyrolysis product in inert atmosphere or in an ammonia atmosphere at temperatures of up to less than about 1100° C. gives rise to the microporous ceramics of the invention. Also provided is a process for the preparation of the microporous ceramics of the invention involving pyrolysis of the ceramic intermediate under controlled conditions of heating up to temperatures of less than 1100° C. to form a microporous ceramic product.

1 Claim, No Drawings

SYNTHESIS OF MICROPOROUS CERAMICS

This is a division of application Ser. No. 08/248,291, filed May 24, 1994 U.S. Pat. No. 5,563,212.

BACKGROUND OF THE INVENTION

1. Field of the Invention

The present invention relates to open pore, microporous ceramic materials and their method of manufacture.

2. Description of Related Art

Porous materials play a particularly important role in a number of chemical processing industries and applications. Separations based on membranes are critical in such fields as chemical recovery, purification and dehumidification. Porous oxides (e.g., clays, silica, alumina and zeolite) are the materials of choice as catalysts or catalyst supports in chemical and petroleum processing reactions such as hydrocracking, hydrodesulfurization, reforming, and polymerization.

With respect to membrane technology, inorganic membranes offer a number of advantages over polymeric membranes which are typically limited to uses at temperatures below about 250° C. These include: i) higher operating temperatures, ii) greater structural integrity and hence the ability to withstand higher pressure differentials and back-flushing and iii) improved resistance to corrosion. Porous oxide, (e.g., aluminum oxide) and carbon membranes offer some of these characteristics, but advanced materials are still required for improved strength, toughness, structural integrity, temperature stability, water and oxygen resistance, thermal shock resistance, molecular selectivity to small molecules and gases, and high flux.

Similar considerations apply to clay and metal oxide type catalysts or catalyst supports, particularly as relates to stability and thermal shock resistance at temperatures above about 500° C.

Ceramic materials of the Si—C, Si—N, Si—C—N, Si—B—C, Si—BN, Al—N, Si—Al—N, B—Al—N and related types appear to offer many of the properties set forth above. However, the solgel synthesis methods typically used to prepare porous oxide membranes or catalyst supports are incompatible with the preparation of ceramics of the type described above because of the need to use water in their preparation. Sintering or reactive sintering of these ceramics likewise produces materials with pore sizes of from about 0.1 to about 1000 microns which are non-uniform and generally too large for effective molecular separation and other uses described above. Chemical vapor deposition can produce microporous ceramic layers, but this tends to be an expensive, high temperature process with limited ability to tailor complex ceramic compositions.

Recently, researchers have discovered improved methods for preparing ceramics using ceramic precursors as starting materials. A ceramic precursor is a material, a chemical compound, oligomer or polymer, which upon pyrolysis in an inert atmosphere and at high temperatures, e.g., above about 700–1000° C., preferably above 1000° C., will undergo cleavage of chemical bonds liberating such species as hydrogen, organic compounds and the like, depending upon the maximum pyrolysis temperature. The resulting decomposition product is typically an amorphous ceramic containing Si—C bonds (silicon carbide), Si—N bonds (silicon nitride) or other bond structures which will vary as a function of the identity of the ceramic precursor, e.g., Si—C—N, Si—N—B, B—N, Al—N and other bond structures, as well as combinations of these structures. Crystallization of these amorphous ceramic products usually requires even higher temperatures in the range of 1200–1600° C.

The pyrolysis of various ceramic precursors, e.g., polycarbosilanes, polysilanes, polycarbosiloxanes, polysilazanes, and like materials at temperatures of 1200° C. and higher to produce ceramic products, e.g., silicon carbide and/or silicon nitride, is disclosed, for example, in M. Peuckert et al., "Ceramics from Organometallic Polymers", Adv. Mater. 2, 398–404 (1990).

During pyrolysis, preceramic precursors such as described above liberate various gaseous decomposition species such as hydrogen and organic compounds, including methane, higher molecular weight hydrocarbon molecules, and lower molecular weight precursor fragments. These gases tend to coalesce within the preceramic matrix as they form, resulting in a bulking or swelling to form a voluminous mass of low bulk density. These entrained gases can also lead to the formation of smaller gas bubbles within the developing ceramic mass as the preceramic precursor crosslinks and hardens, resulting in a reduced density ceramic having a mesoporous or macroporous closed-cell structure, without development of a significant amount of open celled micropores.

Where dense, non-porous ceramic materials are sought using ceramic precursors yielding high gas volumes, it is often necessary to conduct the pyrolysis over a very long period of time with very gradual incremental temperature increases and/or under vacuum to assist in removal of these gaseous species at temperatures where they are formed.

SUMMARY OF THE INVENTION

The present invention provides for amorphous, microporous, ceramic materials having a surface area in excess of 50 m$^2$/gm, preferably in excess of 100 m$^2$/gm, and an open-pore microporous cell structure wherein the micropores have a mean width (diameter) of less than 20 Angstroms and wherein said microporous structure comprises a volume of greater than about 0.015 cm$^3$/gm, preferably greater than 0.05 cm$^3$/gm, of the ceramic. The invention also provides for a preceramic composite intermediate composition comprising a mixture of a ceramic precursor and finely divided particulate material selected from the group consisting of non-silicon containing ceramics, carbon, inorganic compounds having a decomposition temperature greater than 1000° C. and mixtures thereof, whose pyrolysis product in inert atmosphere or in an ammonia atmosphere at temperatures of up to less than about 1100° C. gives rise to the microporous ceramics of the invention. As used in this application, the term "non-silicon containing ceramics" is defined to exclude oxide phases. Also provided is a process for the preparation of the microporous ceramics of the invention comprising: a) forming an intimate mixture comprising from greater than 30 up to about 99 parts by weight of a ceramic precursor oligomer or polymer having a number average molecular weight in the range of from about 200 to about 100,000 g/mole and from about 1 to less than 70 parts by weight of particulate material selected from the group consisting of non-silicon containing ceramics, carbon, inorganic compounds having a decomposition temperature greater than 1000° C. and mixtures thereof, said particles having a mean particle size of less than about 10 microns, b) gradually heating said mixture in the presence of an inert gas or ammonia gas and in sequential stages with hold times at intermediate temperatures to a maximum temperature in the range of from about 400° C. up to less than about 1100° C. and over a period of total heating and hold time of from about 5 to about 50 hours to form a microporous ceramic product, and c) cooling said microporous ceramic product.

The microporous ceramics prepared in accordance with this invention generally exhibit a surface area within the range of from about 50 to about 400 m²/gm based on the combined weight of amorphous phase and particles, and amorphous phase micropore volumes of greater than 0.015 up to about 0.17 cm³/g, wherein the volume fraction of micropores in the ceramic product ranges from about 5% to about 32%.

Ceramics produced in accordance with this invention are particularly useful in bulk sorbent applications, as active layers in membrane separation structures and as catalyst supports.

DETAILED DESCRIPTION OF THE INVENTION

As used herein, the term microporous ceramic refers to a ceramic having a porous structure wherein the pores have a mean width (diameter) of less than 20 Angstroms. This definition and the physical and chemical adsorption behavior of microporous materials are disclosed in S. J. Gregg and K. S. W. Sing, "Adsorption, Surface Area and Porosity", Academic Press, New York, 1982; and S. Lowell and J. F. Shields, "Powder Surface Area and Porosity", Chapman and Hall, New York, 3rd Edition, 1984. This term is to be contrasted with the term "mesoporous" which refers to pores having a mean width of greater than 20 Angstroms up to about 500 Angstroms and the term "macroporous" which refers to pores having a mean width greater than about 500 Angstroms. More specifically, the term microporous refers to such structures wherein essentially all of the pores have a width of from about 2 to about 20 Angstroms. The surface area and micropore volume are calculated from the nitrogen adsorption isotherm, which is measured at 77° K. using an automated continuous flow apparatus. The total surface area is calculated using the BET method, and the micropore volume and mesopore/macropore surface area are calculated using the T-plot method, as described in the Gregg reference above. Subtraction of the mesopore/macropore surface area from the total surface area gives an estimate of the micropore surface area.

Ceramic precursor materials which are preferred for the purposes of this invention include oligomers and polymers such as polysilazanes, polycarbosilazanes, perhydro polysilazanes, polycarbosilanes, vinylicpolysilanes, amine boranes, polyphenylborazanes, carboranesiloxanes, polysilastyrenes, polytitanocarbosilanes, alumanes, polyalazanes and like materials, as well as mixtures thereof, whose pyrolysis products yield ceramic compositions containing structural units having bond linkages selected from Si—c, Si—N, Si—C—N, Si—B, Si—B—N, Si—B—C, Si—C—N—B, Si—Al—N—C, Si—Al—N, Al—N, B—N, Al—N—B and B—N—C, as well as oxycarbide and oxynitride bond linkages such as Si—O—N, Si—Al—O—N and Ti—O—C. The preferred precursors are those oligomers and polymers having a number average molecular weight in the range of from about 200 to about 100,000 g/mole, more preferably from about 400 to about 20,000 g/mole. The chemistry of these oligomeric and polymeric precursors are further disclosed in the monograph "Inorganic Polymers", J. E. Mark, H. R. Allcock, and R. West, Prentice Hall, 1992.

Particularly preferred polysilazanes are those materials disclosed in U.S. Pat. Nos. 4,937,304 and 4,950,381, the complete disclosures of which are incorporated herein by reference. These materials contain, for example, recurring —Si(H)(CH₃)—NH— and —Si(CH₃)₂—NH— units and are prepared by reacting one or a mixture of monomers having the formula R₁SiHX₂ and R₂R₃SiX₂ in anhydrous solvent with ammonia. In the above formulas, R₁, R₂ and R₃ may be the same or different groups selected from hydrocarbyl, alkyl silyl, or alkylamino and X₂ is halogen. The preferred polysilazanes are prepared using methyldichlorosilane or a mixture of methyldichorosilane and dimethyl-dichlorosilane as monomer reactants with ammonia. The primary high temperature pyrolysis product (>1300° C.) of this precursor are silicon nitride (Si₃N₄) and silicon carbide (Sic). These precursors are commercially available from Chisso Corporation, Japan under the trade designations NCP-100 and NCP-200, and have a number average molecular weight of about 6300 and 1300 respectively.

Another class of polysilazane precursors are polyorgano (hydro)silazanes having units of the structure

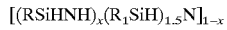

where R₁ is the same or different hydrocarbyl, alkylsilyl, alkylamino or alkoxy and 0.4<X<1. These materials are disclosed in U.S. Pat. No. 4,659,850, the complete disclosure of which is incorporated herein by reference.

Another preferred ceramic precursor is a polysilastyrene having the structure [(phenyl)(methyl)Si—Si(methyl)₂]ₙ available under the trade designation "Polysilastyrene-120" from Nippon Soda, Japan. This material has a number average molecular weight of about 2000 and the primary pyrolysis products silicon carbide and carbon.

Other preferred ceramic precursors are polycarbosilanes having units of the structure (Si(CH₃)₂CH₂)ₙ and/or (Si(H)(CH₃)CH₂)ₙ having a number average molecular weight in the range of about 1000 to 7000. Suitable polycarbosilanes are available from Dow Corning under the trade designation PC-X9-6348 (Mn=1420 g/mol) and from Nippon Carbon of Japan under the trade designation PC-X9-6348 (Mn=1420 g/mol). The main pyrolysis product of these materials in an inert atmosphere are silicon carbide and excess carbon.

Vinylic polysilanes useful in this invention are available from Union Carbide Corporation under the trade designation Y-12044. These yield silicon carbide together with excess carbon as the main pyrolysis product.

Suitable polyalazane (alumane) preceramic precursors are those having recurring units of the structure R—Al—N—R', where R and R', are the same or different hydrocarbyl groups (particularly C₁–C₄ alkyl), and are described in an article "Polymer Precursors For Aluminum Nitride Ceramics", J. A. Jensen, pp. 845–850, in "Better Ceramics Through Chemistry", MRS Symposium Proceedings, Vol. 271. The main pyrolysis product of these materials is aluminum nitride.

Other suitable preceramic precursors will be evident to those skilled in the art, particularly those yielding amorphous or crystal-line phases such as SiC, Si₃N₄, Si—C—N, B—N, Si—B—N, B₄C—BN—C, Si—B—C, Si—Al—N, B—Al—N and Al—N pyrolysis products.

The solid particulate material which is mixed with the ceramic precursor material may be in the form a powder having a mean particle size of less than 10 microns or in the form of finely chopped fibers less than 1 mm long and having a mean diameter of less than 10 microns. These particles may comprise non-silicon containing ceramics such as the nitride of aluminum, the nitrides or carbides of boron, molybdenum, manganese, titanium, zirconium, tungsten and other refractory or rare earth metals, as well as ceramics containing a combination of bond linkages such as B—Al—N, B—N—C and Al—N—B. These particles may have either a crystalline or amorphous atomic structure.

Other types of particles which may be used include carbon in various forms such as carbon black, carbon fibers, natural or synthetic diamond and tubular fullerenes.

Still other types of particles which may be employed include non-ceramic inorganic compounds having a decomposition temperature in excess of 400° C., preferably in excess of 500° C. to 1100° C. These include Periodic Table Group II, III, IV, V, VI, VII and VIII metal and non-metal oxides, hydroxides, sulfides and like compounds such as alumina (aluminum oxide), silica, iron oxides, copper oxides, nickel oxides, titanium dioxide, zinc oxide, magnesium oxide, chromium oxide, calcium oxide and like materials, as well as crystalline silica-aluminates such as clay, silicalite and zeolites such as Zeolite X, Zeolite Y, beta Zeolite, Zeolite L, Zeolites ZSM-5, ZSM-11, ZSM-25 and like materials.

The surface area and the degree of microporosity which can be achieved in the microporous ceramics prepared in accordance with this invention has been found to vary inversely with the mean particle size or mean diameter of the particles which are blended with the ceramic precursor to form the composite intermediate. Where the mean particle size or diameter is large, i.e., 20 microns or greater, the particles tend to settle within the preceramic matrix giving rise to two distinct phases, i.e., a dense phase and a voluminous non-microporous phase containing high and low concentrations of particles respectively. Preferably the particles will have a mean particle size or diameter of less than 10 microns, preferably less than 5 microns and more preferably from about 0.1 to about 2 microns. Where necessary, commercially available materials of larger particle size can be ground by any suitable means, including cryogenic grinding below minus 100° C., to achieve non-aggregate, mean particle sizes within these preferred ranges.

Although the factors underlying the development of the microporous, open-celled ceramic structure achieved in accordance with this invention are not completely understood, it is believed that the individual solid particulates dispersed within the molten or glassy preceramic polymer matrix serve to prevent nucleation of large bubbles of decomposition gases which form within the matrix as the temperature increases. The decomposition gases thus more readily escape from the matrix by diffusion, thereby avoiding the development of a voluminous swelling of the ceramic mass. The elimination of molecular species from the ceramic precursor molecules, accompanied by crosslinking, provides a templating effect which thus entrains a significant volume of microporosity and contributes to enhanced surface area of the resulting solidified ceramic mass.

Another factor which has been found to influence both the total surface area and degree of microporosity achieved in the pyrolyzed ceramic of this invention is the amount of ceramic precursor mixed with the additive particles to form the composite intermediate. This level will vary within the range of from greater than 30 parts by weight up to about 99 parts by weight of ceramic precursor and correspondingly from about 1 to less than 70 parts by weight of the particles. Microporous ceramics having a post-pyrolysis surface area in excess of about 150 m$^2$/gm and a micropore volume in excess of 0.03 cm$^3$/gm, preferably in excess of 0.05 cm$^3$/gm, can be achieved when the amount of ceramic precursor mixed with the particles to form the composite intermediate is in excess of 40 parts by weight up to about 80 parts by weight precursor and the balance to 100 parts by weight of particles. The most preferred range is from about 50 to about 70 parts by weight ceramic precursor per corresponding about 30 to about 50 parts by weight of additive particles, since composite intermediates containing this latter ratio of components can yield post-pyrolysis surface areas of greater than 200 m$^2$/gm and micropore volumes of greater than 0.08 cm$^3$/gm.

The microporous ceramic compositions of this invention are prepared by first forming an intimate mixture of the ceramic precursor and the additive particles to provide a composite intermediate, followed by pyrolysis of the composite intermediate under an inert atmosphere or ammonia in sequential stages with hold times at intermediate temperatures to a final temperature in the range of from about 400° C. to less than 1100° C.

The composite intermediate mixture may be formed by any suitable process which will provide for a uniform dispersion of the particles within the ceramic precursor matrix. Thus, the components may be ground, ball milled or pulverized together in dry form, or the components may be slurry blended by forming a very fine suspension of the additive particles in an organic liquid which is a solvent for the ceramic precursor, dissolving the precursor in the solvent to form a slurry and evaporating the solvent at temperatures of 30 to 80° C. at atmospheric pressure or under vacuum to obtain a composite intermediate composed of the preceramic precursor having the particles uniformly dispersed therein. The composite may then be comminuted to provide a particulate molding powder.

Suitable solvents for the solution blending process include aromatic and aliphatic hydrocarbons such as benzene, toluene, and hexane, as well as ethers such as tetrahydrofuran, diethyl ether and dimethyl ether. Where the slurry blending technique is used, the ceramic precursor and particles are preferably added to the solvent at a combined weight ratio within the range of from about 20% to 50% by weight solids. Ultrasonic mixing techniques and/or a suitable disperant can be used to facilitate the formation of a very fine suspension of the particles in the organic solvent.

Prior to pyrolysis, the composite intermediate may be formed into any desired shape such as a pellet, disc, fiber, thin membrane or other three dimensional shape. The dry composite may be shaped using an extruder or a hydraulic press, with or without heat being applied, or by conducting the pyrolysis in a suitable mold cavity containing the composite intermediate. Fibers may be prepared by extruding or spinning a melt or a solvent slurry of the composite intermediate, while thin separation membranes may be formed by applying a melt or solvent slurry of the composite intermediate to the surface of a suitable substrate, such as another ceramic, and subjecting the structure to well known spin or whirl coating techniques to form a uniform, thin coating of the composite intermediate on the surface of the substrate, followed by heating to evaporate off the solvent where solvent is present.

As indicated above, pyrolysis of the composite intermediate is next conducted by heating it under inert flowing gas, e.g., argon, helium or nitrogen, or under flowing ammonia gas, at a controlled rate of temperature, with preferred hold times at intermediate temperatures to maintain uniformity of the ceramic product, and a final hold time at the maximum heating temperature, followed by gradual cooling of the ceramic end product to room temperature. The heating rate may range from about 0.5 to 10° C. per minute, more preferably from about 0.5 to 6° C. per minute and most preferably from about 0.5 to less than 3° C. per minute.

Generally speaking, microporous ceramics are formed by gradually heating the composite intermediate to a maximum temperature ($T_{max}$) in the range of from about 400° C. to less than about 1100° at a heating rate in the range of from about 30° C. to 400° C. per hour, with various holding times of about 0.5 to about 5 hours at selected temperatures between about 200° C. and $T_{max}$. Total combined heating/holding time may range from about 5 to about 50 hours, more preferably from about 8 to about 24 hours. Holding times and temperatures are dictated by ceramic precursor decomposition and reaction kinetics. Hence, they depend on precursor composition and the rate of evolution of specific molecular species at or about the holding temperature, e.g., $CH_4$, $H_2$, higher molecular weight hydrocarbon or H-C-N species or precursor fragments, as reflected by sample weight losses at or about these temperatures. The flow rate of the inert gas or ammonia gas may range from about 100 to about 1000 cc per minute.

In the more preferred embodiment of the invention, pyrolysis is carried out in a heat treating furnace or muffle oven using the following schedule and using flowing inert gas or ammonia throughout:

i) after flushing the furnace with inert gas, e.g., helium, the temperature is first increased to about 200±25° C. over a period of 0.5–3 hours, held at that temperature for a period of 0.5–5 hours, preferably 1–2 hours and the temperature then increased;

ii) in the second step, the temperature is increased to about 300±25° C. over a time of from about 0.5 to 5 hours, preferably from 1–2 hours and held at that temperature for 0.5–5 hours, preferably 1–2 hours, and the temperature again increased;

iii) in the third step the temperature is increased to $T_{max}$ or about 500±25° C., whichever is less, over a time period up to about 5 hours, preferably up to 2 hours, and held at that temperature for 0.5–5 hours, preferably 1–2 hours;

iv) in a fourth step where $T_{max}$ is above 500° C., the temperature is increased to $T_{max}$ or about 700±25° C., whichever is less, over a time period up to about 5 hours, preferably up to 2 hours, and held at that temperature for 0.5–5 hours, preferably 1–2 hours;

v) in a subsequent step where $T_{max}$ ranges between 700° C. and 1100° C., the temperature is increased to $T_{max}$ over a time period of up to 5 hours, preferably 1–3 hours, and held at $T_{max}$ for 0.5–5 hours, preferably 1–2 hours.

In the most preferred embodiment of the invention, the composite intermediate is heated as above with a 1–2 hour hold at about 200° C., 300° C., 500° C. and 700° C. (and $T_{max}$ if $T_{max}$ is greater than 700° C.), and the pyrolyzed ceramic then allowed to return from $T_{max}$ to room temperature while continuing the flow of inert gas or ammonia during the cooling period.

In addition to particle size and quantity of particles present in the composite intermediate, another factor which influences both surface area and the degree of microporosity which can be achieved in the microporous ceramic is the final temperature to which the ceramic is heated. It has been found with respect to most composite intermediates pyrolyzed under inert or ammonia gas that the surface area and degree of microporosity tends to diminish as $T_{max}$ approaches 1100° C., and tends to be at maximum levels at $T_{max}$ of up to about 700° C.±150° C. For these reasons, a more preferred heating schedule is such that $T_{max}$ ranges from about 500° C. to about 850° C., more preferably from about 550° C. to about 750° C.

The following examples are illustrative of the invention. As used in the examples and tables, the following designations have the following meanings:

NCP-100—A polysilazane polymer available from the Chisso Corporation of Japan having a number average molecular weight of about 6300 g/mole and a melting point of about 200° C.

NCP-200—A polysilazane polymer available from the Chisso Corporation of Japan having a number average molecular weight of about 1300 g/mole and a melting point of about 100° C.

PCS—A polycarbosilane preceramic polymer available from Nippon Carbon Company of Japan (U.S. distribution Dow Chemical Company) having a number average molecular weight of about 2000 g/mole and a melting point of about 100° C.

PSS—A polysilastyrene preceramic polymer available from Nippon Soda Corporation of Japan having a number average molecular weight of about 2000 g/mole and a melting pointing of about 200° C.

EXAMPLE 1

(D23-2–D25-3)

Mixtures of 1.8 grams of the preceramic polymer (PCP) identified in Table 1 and 1.2 grams of alumina ($Al_2O_3$) having a particle size of about 1 micron or 0.05 microns as set forth in Table 1 were prepared by grinding each mixture in an agate mortar and pestle. The ground mixtures were then each placed in a 40 cc polystyrene jar together with 0.6 cm alumina balls and mixed on a rolling mill for 48 hours. The mixtures were then each transferred to an aluminum oxide boat and inserted in the steel liner of a heat treating furnace.

The material was then heated in helium (He) to a final temperature of 500° C., 600° C., 700° C., 850° C. or 1000° C. The general temperature-time sequence used was as follows: Purge with He at a flow rate of 300 cc/min for 30 minutes. Heat in 60 minutes to 200° C. and hold at that temperature for 240 minutes. Then heat in 120 minutes to 300° C., followed by a hold for 300 minutes at that temperature. Next, heat to 400° C. in 120 minutes, followed by a hold for 300 minutes at that temperature. Then heat in 120 minutes to 500° C. If this if the final temperature, heat for 120 minutes, followed by cool to room temperature. For 700° C. run schedule, heat from 500° C. to 700° C. in 120 minutes, and hold for 120 minutes before cooling to room temperature. For 850° C. run schedule, heat from 700° C. to 850° C. in 120 minutes, and hold for 120 minutes before cooling to room temperature. For 1000° C. run, heat from 850° C. to 1000° C. in 120 minutes and hold at that temperature for 120 minutes before cooling to room temperature in 480 minutes.

The resulting compact or granular products all exhibited Type 1 nitrogen adsorption isotherms. Surface area and micropore volume analysis on each sample is shown in Table 1.

TABLE 1

| Sample Number | $Al_2O_3$ Particle Size (micron) | PCP | Surface Area ($m^2/gm$) | Micropore Volume ($cm^3/gm$) | Maximum Temp. (° C.) |
|---|---|---|---|---|---|
| D23-2 | 0.05 | NCP-200 | 323 | 0.1186 | 500 |
| D23-1 | 0.05 | NCP-100 | 331 | 0.1214 | 500 |
| D24-2 | 0.05 | NCP-200 | 372 | 0.1441 | 600 |

TABLE 1-continued

| Sample Number | Al$_2$O$_3$ Particle Size (micron) | PCP | Surface Area (m$^2$/gm) | Micropore Volume (cm$^3$/gm) | Maximum Temp. (° C.) |
|---|---|---|---|---|---|
| D24-1 | 0.05 | NCP-100 | 321 | 0.1196 | 600 |
| D18-4 | 1 | NCP-200 | 198 | 0.0793 | 700 |
| D18-5 | 0.05 | NCP-200 | 212 | 0.0834 | 700 |
| D26-2 | 0.05 | NCP-200 | 260 | 0.1021 | 850 |
| D26-1 | 0.05 | NCP-100 | 158 | 0.0590 | 850 |
| D26-3 | 0.05 | PCS | 164 | 0.0652 | 850 |
| D25-2 | 0.05 | NCP-200 | 130 | 0.0507 | 1000 |
| D25-1 | 0.05 | NCP-100 | 66 | 0.0232 | 1000 |
| D25-3 | 0.05 | PCS | 87 | 0.0328 | 1000 |

The data in Table 1 show that at a 60-40 PCP/Al$_2$O$_3$ blend ratio, the surface area and micropore volume present in the resulting ceramic product tends to vary inversely as a function of the maximum pyrolysis temperature.

EXAMPLE 2

(D18-3)

A mixture of 1.8 gm of NCP-200 polysilazane and 1.2 gm of a silicalite powder having an average particle size of about 1 micron was prepared and processed as in Example 1. The mixture was pyrolyzed in flowing helium as set forth in Example 1 except that heating was discontinued at a T$_{max}$ of about 700° C. The resulting product exhibited a Type 1 nitrogen adsorption isotherm, a surface area of 190 m$^2$/gm and a micropore volume of 0.0799 cm$^3$/gm.

EXAMPLE 3

(D18-1)

A polysilazane-ceramic mixture was prepared in the manner described in Example 2 except that the silicalite was substituted by a typical carbon black powder. The resulting product sample exhibited a Type 1 nitrogen adsorption isotherm, and had a surface area of 260 m$^2$/gm and a micropore volume of 0.1002 cm$^3$/gm.

EXAMPLE 4

(D18-2)

A polysilazane-ceramic mixture was prepared in the manner described in Example 2 except that the silicalite was substituted with a powder of <1 micron filamentous carbon. The resulting product sample exhibited a Type 1 nitrogen adsorption isotherm, and had a surface area of 149 m$^2$/gm and a micropore volume of 0.0534 cm$^3$/gm.

EXAMPLE 5

(D34-1)

A polysilazane-ceramic mixture was prepared in the manner described in Example 2 except that the silicalite was substituted by an aluminum nitride ceramic powder having an average particle size of about 1.6 micron. The resulting product sample exhibited a Type 1 nitrogen adsorption isotherm, and had a surface area of 192 m$^2$/gm and a micropore volume of 0.0769 cm$^3$/gm.

EXAMPLE 6

A series of four different mixtures of 3 gms each of polysilazane silazane preceramic polymers identified in Table 2 were mixed with 2 grams of powder materials also identified in Table 2 by a two step solvent blending process. The two materials were mixed and then added to about 15 cc of toluene in a glass beaker. The polysilazane dissolved, and upon stirring a slurry was formed with the powdery additive. Next the toluene was evaporated on a hot plate. The integrally mixed samples of polysilazane polymer and powder were then placed in an aluminum oxide boat, and inserted into a steel heat treating furnace. The samples were then heated to 700° C. in He, using the schedule described in Example 2. Each of the resulting pyrolyzed samples exhibited a Type 1 nitrogen adsorption isotherm, demonstrating microporosity. The surface area and micropore volume on each of these product samples are shown in Table 2.

TABLE 2

| Sample Number | PCP | 2nd Phase | T$_{max}$ (° C.) | Micropore Volume (cm$^3$/gm) | Surface Area (m$^2$/gm) |
|---|---|---|---|---|---|
| D11-4 | NCP-100 | 5µ diamond | 700 | 0.0144 | 45 |
| D12-5 | NCP-100 | 1µ Zeolite "LZ 210" | 700 | 0.0349 | 108 |
| D12-6 | NCP-100 | 1µ Zeolite "L" | 700 | 0.0459 | 120 |
| D16-5 | NCP-100 | 0.6µ TiO$_2$ | 700 | 0.0257 | 81 |

EXAMPLE 7

Effect of Heating to 700° C. for PCP/Metal Oxide Mixtures

A series of five different mixtures of 1.8 gms each of polycarbosilane preceramic polymer, PC-X9-6348 from Dow Corning, identified in Table 3 were mixed with 1.2 gms of metal oxide powder materials, also identified in Table 3, by a two-step blending process. The metal oxide powders obtained commercially from CERAC were first seived to <20 µm particle size and then mixed with the polycarbosilane material in a mortar and pestle. Then each of the five mixtures in Table 3 was placed in a 40 cc polystyrene plastic jar together with 0.6 cm alumina balls and mixed on a rolling mill for 2 hours. The resulting material was then heated in He to 700° C., using the schedule described in Example 2. Each of the resulting ceramic product samples exhibited a Type 1 nitrogen adsorption isotherm, demonstrating that they are microporous. The surface area and micropore volume of each of the pyrolyzed samples are shown in Table 3.

TABLE 3

| Sample Number | PCP | 2nd Phase | T$_{max}$ (° C.) | Micropore Volume (cm$^3$/gm) | Surface Area (m$^2$/gm) |
|---|---|---|---|---|---|
| D46-1 | PCS | ZnO | 700 | 0.0551 | 148 |
| D46-2 | PCS | MgO | 700 | 0.0991 | 244 |
| D46-3 | PCS | FeO | 700 | 0.0154 | 51 |
| D46-4 | PCS | CuO | 700 | 0.0144 | 52 |
| D46-5 | PCS | NiO | 700 | 0.0566 | 149 |

EXAMPLE 8

Effect of Heating to 1300° C. for PCP/2nd Phase Mixtures

Two samples described in Table 4 were prepared as follows. A mixture of 1.8 gm of NCP-200 preceramic polymer (PCP) was made with 1.2 gm of Al$_2$O$_3$ or AlN to provide a 60/40 mixture. Then the mixtures were placed in a 40 cc polystyrene jar together with 0.6 cm alumina balls and mixed on a rolling mill for 48 hours. The resulting material was then heated in flowing He to a final temperature of 1300° C. The schedule from room temperature to 1000° C. was similar to that previously described in Example 1. The heating from 1000° C. to 1300° C. was done in 120 minutes, with a hold at 1300° C. for 60 minutes, followed by cooling to room temperature in 480 minutes. It can be seen from the micropore volumes in Table 4 that the microporosity obtained by heating all the way to 1300° C. is quite small.

The relatively high surface areas are the surface areas of fine particles, as evidenced by the fact that Type 1 isotherms were not obtained.

TABLE 4

Samples of Example 8, Heated to 1300° C.

| Sample Number | PCP | 2nd Phase | $T_{max}$ (° C.) | Micropore Volume (cm³/gm) | Surface Area (m²/gm) |
|---|---|---|---|---|---|
| D31-1 | NCP-200 | 0.5μ Al₂O₃ | 1300 | 0.0028 | 62 |
| D31-2 | NCP-200 | 1.6μ AlN | 1300 | 0.0003 | 9 |

EXAMPLE 9

Microporosity of Thermally Decomposed PCP/2nd Phase Mixtures Pyrolyzed in Ammonia Gas A series of samples described in Table 5 were prepared as follows. A mixture of 1.8 gm or preceramic polymer (PCP) was made with 1.2 gm of the second phase (2nd Phase), using 1.6 micron AlN powder as the second phase. Each mixture was placed in a 40 cc polystyrene jar together with 0.6 cm alumina balls and mixed on a rolling mill for 2 hours. Each of the resulting mixtures was placed in an aluminum oxide boat and inserted in the steel linear of a heat treating furnace, and was then heated in flowing ammonia at 300 cc/min to a maximum temperature of 700° C. according to the heating schedule described in Example 2. Each of the resulting product samples exhibited a Type 1 nitrogen adsorption isotherm, demonstrating that they are microporous. The surface area and micropore volume of each of the pyrolyzed samples are shown in Table 5.

TABLE 5

Thermal Decomposition in Ammonia Gas

| Sample Number | 2nd Phase | PCP | Surface Area (m²/gm) | Micropore Volume (cm³/gm) | Maximum Temp. (° C.) |
|---|---|---|---|---|---|
| 38-4 | 1.6μ AlN | PCS | 318 | 0.1283 | 700 |
| 39-3 | 1.6μ AlN | NCP-200 | 141 | 0.0573 | 700 |
| 39-6 | 1.6μ AlN | NCP-100 | 179 | 0.0719 | 700 |
| 39-9 | 1.6μ AlN | PSS | 113 | 0.0447 | 700 |

EXAMPLE 10

(D35-3)—Control

A sample of 3 gm of NCP-200 polysilazane was ground in a mortar and pestle and heated by itself in an alumina crucible using the heating schedule described in Example 1. After heating to 700° C., the resulting product sample exhibited a very low surface area (<1 m²/gm), with no microporosity observed in the nitrogen adsorption and no micropore volume.

EXAMPLE 11

(D35-2)—Control

A sample of 3 gm of NCP-100 polysilazane was ground in a mortar and pestle and heated by itself in an aluminum crucible using the heating schedule described in Example 1. After heating to 700° C., the resulting product sample exhibited a very low surface area (<1 m²/gm), with no microporosity observed in the nitrogen adsorption.

EXAMPLE 12

(D35-5)—Control

Example 11 was repeated except that PCS polysilastyrene was substituted for NCP-100 polysilazane. After heating to 700° C., the resulting product exhibited a surface area of less than 1 m²/gm with no observable microporosity.

EXAMPLE 13

(D36-1)—Control

Example 11 was repeated except that PCS polycarbosilane was substituted for NCP-100 polysilazane. After heating to 700° C., the resulting product exhibited a surface area of less than 1 m²/gm with no observable microporosity.

Control Examples 10–13 demonstrate that heating the various ceramic precursors which do not contain the particulate additives in inert helium gas does not provide ceramic products having the microporous structure which is the subject matter of this invention.

What is claimed is:

1. A preceramic composite intermediate composition consisting essentially of a mixture of greater than 30 parts by weight of a polysilastyrene ceramic precursor oligomer or polymer having a number average molecular weight in the range of from about 200 to about 100,000 g/mole having uniformly dispersed therein less than 70 parts by weight of a crystalline aluminosilicate particulate material having a decomposition temperature greater than 400° C., said particulate material having a mean particle size or mean diameter of less than about 10 microns; whereby the preceramic composite intermediate composition is capable of forming a microporous ceramic product having a surface area in excess of 50 m²/gm and a volume of micropores greater than about 0.015 cm³/gm.

* * * * *